O. A. KNOPP.
ELECTRIC MEASURING AND CALIBRATING METHOD.
APPLICATION FILED NOV. 20, 1916.
1,372,821.
Patented Mar. 29, 1921.
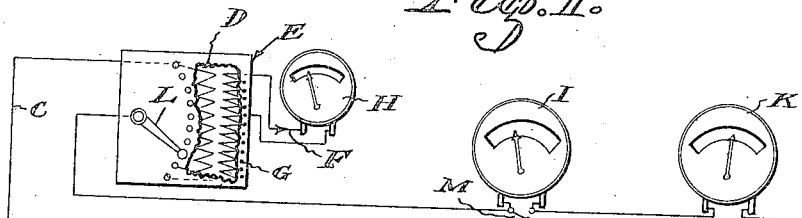
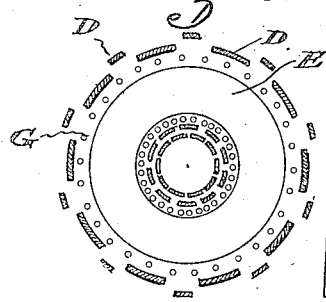
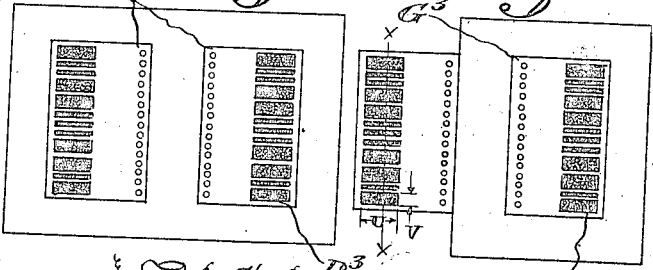
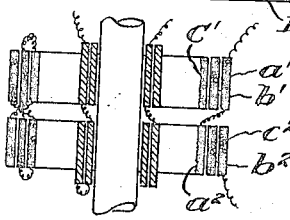
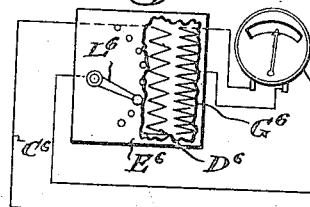
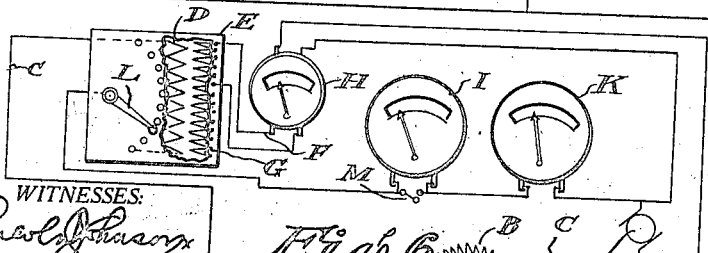
WITNESSES:
INVENTOR.
BY
ATTORNEY.

UNITED STATES PATENT OFFICE.

OTTO A. KNOPP, OF OAKLAND, CALIFORNIA.

ELECTRIC MEASURING AND CALIBRATING METHOD.

1,372,821.     Specification of Letters Patent.     Patented Mar. 29, 1921.

Application filed November 20, 1916. Serial No. 132,246.

*To all whom it may concern:*

Be it known that I, OTTO A. KNOPP, a citizen of the United States, residing in the city of Oakland, county of Alameda, and State of California, have made a new and useful invention—to wit, Improvements in Electric Measuring and Calibrating Methods; and I do declare the following to be a full, clear, concise, and exact description of the same.

In this specification and the annexed drawings the invention is illustrated in the form considered to be the best, but it is to be understood that the invention is not limited to such form because it may be embodied in other forms, and it is also to be understood that in and by the claims following the description it is desired to cover the invention in whatever form it may be embodied.

Among the objects of this invention are to provide a method and suitable apparatus for measuring amperes, volts, watts, ampere-hours and watt-hours, and for calibrating, scaling or checking ammeters, voltmeters, wattmeters, ampere-hour meters, watt-hour meters, etc.

In the one sheet of drawings:

Figure 1 is a wiring diagram illustrating the method of measuring and proportioning amperage for testing ammeters in accordance with this invention.

Fig. 2 is a diagrammatic cross section of a circular core transformer, illustrating the arrangement for uniform relation between primary and secondary windings.

Fig. 3 is a modification of the same illustrating the "core type" core.

Fig. 4 is a similar view illustrating the "shell type" core.

Fig. 5 illustrates a further modification of the winding adaptable to either the "core type" or "shell type" of core.

Fig. 6 is a similar view to Fig. 1 applicable to wattmeters.

Fig. 7 is a similar view of the same applicable to voltmeters.

To measure such electric quantities, calibrate, scale or check such instruments at the present time, it is customary to provide a great number of expensive standards and keep all these standards accurate at all times. With this invention it will be possible to reduce the equipment of measuring and the calibrating instruments to one standard for each electrical unit; that is, one ammeter, one voltmeter, one wattmeter, one watt-hour meter and one ampere-hour meter, it being made possible with each of these instruments to measure any value or any multiple or fraction of that unit, which the respective apparatus is built for.

Referring to Fig. 1 which diagrammatically represents the new apparatus and its application: "A" represents the alternating current source, "B" represents the rheostate regulating the current "C" drawn from the source "A." This current "C" enters a winding "D" of the transformer "E," which transforms the current "C" into a current "F" in the secondary winding "G." This current "F" is measured by an auxiliary meter "H." The current "C" after leaving the winding "D" passes through the standard meter "I" and the meter under test "K" and returns to the source "A". The winding "D" on the transformer "E" is made up of a special winding with taps to sections of different current capacities, starting with small wire and gradually increasing in certain steps to a large sized wire. It is a well known fact that if a current "C" is sent through one turn of the winding "D," or two turns, or three turns, or $x$ turns, we obtain in the secondary winding "G" or any portion of the winding "G" or "D" to which the meter "H" may be connected values of currents which are in proportion to the original current of one to two, one to three, one to four, one to $x$. Further if the current "C" is changed reciprocally to the number of turns, or sent through the winding "D" the current "C," which for one turn is one, for two turns one-half, for three turns one-third, for $x$ turns $1/x$, we obtain in the secondary winding "G" the same current flow in all cases and this fact is made the foundation of the new measuring instrument and calibrating apparatus.

First, if, for instance, we want to measure the certain unknown current "C," flowing from its source "A," we have the lever "L," which lets the current into the winding "D," set on a certain tap; we can give the auxiliary meter "H" any desired capacity, this capacity changing in ratio reciprocal to the number of turns cut into the circuit of the current passed in the winding "D" by the lever "L." The transformer "D," therefore, represents, in this case, a current transformer with a multiple range winding, the characteristic difference between this current transformer and other multiple range current transformers being that the multiple ratios are obtained by a continuous winding changing in carrying capacity of its turns in reciprocal ratio to the current sent through this winding, making it possible to provide a measuring instrument with a transformer which gives the former a great number of ranges, practically covering the whole field of commercial measurements.

Second, if we want to calibrate an ammeter "K" with the current "C", we have here the means to change this current "C" with precision to any desired amount required. For calibrating or scaling this ammeter "K" the procedure is as follows: The current "C" is regulated to make a preliminary setting of the auxiliary meter "H" by holding a fixed amount on the standard "I", causing the auxiliary meter to show a certain reading, which depends on the particular setting of the lever "L", and the particular connection being made to the secondary winding "G" or any portion of the windings "G" or "D"—taps being provided on this secondary winding or primary windings, so as to bring the value of the current "F" to such a magnitude as to be readable on the auxiliary meter "H", with the highest possible degree of accuracy. If we now change the lever setting "L" and regulate simultaneously the current "C" on the rheostat "B", so that the auxiliary meter "H" reads exactly the same value as before, we will have changed our current "C" in a certain ratio reciprocal to the change in the number of those turns through which the current "C" passes between the lever setting "L" and the end of the winding "D". It has been found by calculation that it is possible to find a suitable number of turns which can be employed so that the above mentioned reciprocals of turns of these sections will give all the current values required for commercial testing.

All commercial instruments, have fifteen or less calibration points; in other words, 150 or less divisions, in most cases 150 or 100. If it is desired to divide a current value in 15 or 10 parts, it requires a winding "D" on the transformer "E", whose number of turns are divisible by all the values from 15 down to 1.

It is obvious that a number which can be divided by all these numbers will be very large. It would be difficult to build such a transformer which would be of any practical value. It has been found necessary, in order to remain within practical limits, to obtain the full calibration of 15 point instruments, by making two or three different settings from the standard "I". To give a concrete sample for the winding of practical dimensions, assume a 5 ampere standard necessarily correct only on one point, say the 5 ampere point. If a current "C" of 5 amperes, as indicated by the standard "I" is sent through a section of the winding "D", of say 360 turns, and cut the whole secondary winding "G" of the transformer "E", of say 360 turns, across the auxiliary ammeter "H", we obtain a current "F" of a little less than 5 amperes, flowing through the auxiliary meter "H". If we now cut out one half of the turns in the primary winding "G" by the lever "L", by moving to the next tap, we will have to double the current "C" exactly; that is, cause 10 amperes to flow through the circuit A, B, D, L, I, K, A, in order to make the auxiliary meter "H" read the same value, and if the meter under test "K" is an ammeter, of say, 150 amperes capacity, it will deflect to the lowest calibration mark of 1/15 of full scale, or ten divisions. If we cut out another section of the winding so that the 90 turns remain in circuit we will have to regulate the current to double the value again; that is, 20 amperes exactly, in order to make the auxiliary meter "H" read the same again, and so on. It may be noted that after raising the current "C" above 5 amperes the standard I is short circuited by means of the switch "M", or removed entirely. With 60 turns cut in we obtain the 30 ampere point, with 45 turns cut in we obtain the 40 ampere point, with 36 turns cut in we obtain the 50 ampere point, with 30 turns cut in we obtain the 60 ampere point. The 70 and 80 ampere points cannot be obtained. The 90 ampere point is obtained with 20 turns cut in, the 100 ampere point is obtained with 18 turns cut in, the 110 point cannot be obtained, the 120 ampere point is obtained with 15 turns cut in, the 130 and 140 ampere points cannot be obtained, the 150 ampere point is obtained with 12 turns cut in. In order now to calibrate the remaining points we obtain a new setting with our standard by setting the lever "L" on a tap of 364 turns hold 5 amperes on the standard "I" and read again the auxiliary meter "H". By holding this same reading on the auxiliary meter "H", with the following lever setting, cutting in, respectively, 26, 14 and 13 turns we obtain the current value of 70 amperes 130 amperes, 140 amperes respectively. To obtain the balance we hold the standard "I" on 5 amperes again with the lever setting, cutting in 352 turns, note the reading on the auxiliary meter "H" and change the lever setting so as to cut in 22 turns and 16 turns and change the current, respectively, to exactly 80 and 110 amperes, by holding the auxiliary meter "H" on the new reading. It can be seen that by means of the single accurate value, in this case 5 amperes, we calibrate a 150 ampere meter over its full scale.

In order to get a calibration on smaller meters, of say 100 amperes, the procedures are identical. The auxiliary meter "H" is left connected to the same taps of the windings of the transformer "E." The calibration is carried only from 10 up to 100 points in 10 successive steps. The 75 ampere ammeter can be calibrated in 15 equal steps in the following simple manner: The setting for the auxiliary meter "H" is taken with the lever setting "L," corresponding to double that held on the standard "I"; in other words, on a tap which cuts half as many turns in circuit of the current "C," compared with the previous setting when calibrating the 150 and 100 ampere meters. The auxiliary meter "H" gets its current "F" from the winding "G" by connecting to a different tap of this winding so as to bring its reading again to approximately the same point as before. This is the case if about half the number of turns are cut in or about 180. This 10 ampere tap, or 180 turn point, tapped by the lever "L" is also always our first calibration point on any scale of any ammeter; that is, the 10 division point and it will give on our meter under test "K," if we hold on the auxiliary meter "H" the just determined setting, our first calibration point of 5 amperes, which on 75 amperes meters is the 10 division calibration point. If we continue to proceed as described for the calibration of the 150 ampere ammeter, we will advance now in 5 ampere steps against 10 ampere steps before, and in 15 steps of 5 amperes we have covered the full scale of a 75 ampere meter. A 50 ampere meter can be calibrated in the same fashion, only advancing, instead of to 75, to 50 amperes in 10 steps,—a 50 ampere meter having a 100 division scale with 10 calibration points. A 30 ampere ammeter being 1/5 of the capacity of the 150 ampere meter, also divided into 150 divisions, can be calibrated by getting a setting for the auxiliary meter "H," and hold the current "C" at 5 amperes by means of the standard "I," but with a lever setting "L" to cut in 72 turns or 1/5 the turns cut in when calibrating the 150 ampere ammeter, then every calibrating value will be 1/5, and so on. It can be readily seen by carrying this method farther we can calibrate ammeters of smaller and smaller capacity, by simply putting our standard with the lever setting "L" so that less and less turns are cut in, thus making each of the 15 calibrating steps smaller and smaller, the auxiliary meter for each group of ammeters is preferably changed to a corresponding tap so as to bring the reading up to a high value, which can be read with accuracy.

To sum up, we can, with this transformer, first give an auxiliary meter any capacity, thus measure currents with equal accuracy, of large values and small values; second, by means of one given 5 ampere value or any other current value, calibrate or lay down any other current values required on any commercial instrument with the same accuracy, with which this original reference point or standard value was laid down—the accuracy of the transformer "E" or that of the auxiliary meter "H" does not enter into the problem. To make this latter assertion hold absolutely correct, the winding "D" has to be so arranged that for equal ampere turns each consecutive section has exactly the same effect in regard to producing the current "F" in the winding "G." It, therefore, has been found necessary to arrange the winding "D" so that each added section has its geometric center or center of effect at the same distance from the secondary winding "G." This has been found and can be accomplished on a circular transformer core by winding the secondary winding "G," Fig. 2, evenly around the circular core "E" and the primary winding "D" is wound over the winding "G" in such a manner that each section is spread uniformly over the whole circle, the geometric center of effect of each section being at the same point; that is, the center point of the circle. For a core type transformer core, see Fig. 3, its secondary winding "$G^3$" is wound again close to the core and the different sections of the primary winding "$D^3$" are wound as shown so that the geometric center of the cross section of each section falls upon a parallel line $x\ x$; that is each section has the same width "U," but irregular height "V." The same arrangement is made for the shell type core, shown in Fig. 4. A third arrangement applicable to core and shell type transformer is to wind each section in two parts, 1 and 2, see Fig. 5. Each part is in a different coil so arranged that in one coil the part is near the secondary and in the other coil farther from the secondary; by connecting the sections as in diagram 5, half section $a'$, with half section $a^2$, and half section $b'$, with half section $b^2$, and half section $c'$ with half section $c^2$ and so on, we can make the centers of effect of all full sections $a$—$a$ and $b$—$b$ and $c$—$c$ fall on the same point. To make the effect upon the secondary alike for all sections as in the first two arrangements, it is necessary to wind the sections of the secondary so that each section spreads over the whole winding length.

In calibrating ammeters it is, of course, understood that the auxiliary meter and the standard are also ammeters. When calibrating wattmeters each of these instruments is a wattmeter, and in case the instrument to be calibrated is a watt-hour meter, the auxiliary is also a watt-hour meter; whereas, the standard is preferably a wattmeter, as the time or hours are not entering into the calibration of the watt-hour meter, it being made the same for both by starting and stopping them together after running them a given period of time as measured by a suitable timing device. It is also to be understood that in case of wattmeters or watt-hour meter work, all three instruments are connected to a common potential, preferably taken from the same source A, see Fig. 6.

To calibrate voltmeters after the above method proceed as per Fig. 7. A variable voltage source is provided at $A^6$ to which are connected in parallel the standard $I^6$ the meter under test $K^6$ and also a section of the primary winding $D^6$ of the transformer $E^6$. This voltage $A^6$ by means of this transformer $E^6$ is thus transformed to another potential, which causes the auxiliary meter $H^6$ to deflect to the suitable point on the scale which can be read with accuracy.

First. To measure different voltages of the source $A^6$, use the auxiliary meter $H^6$ and vary its range by tapping the winding with the lever $L^6$ at different points, thus providing a multiple range voltage measuring apparatus. Second. This apparatus can be used for calibrating any commercial voltmeter $K^6$ by means of a single voltage standard $I^6$ providing only one accurate voltage point as reference point, similar to the previously described method for proportioning amperes and watts. For example, we have a standard $I^6$ which gives 100 volts and we want to calibrate a 100 volt voltmeter, having 10 calibration points. By bringing the variable voltage $A^6$ by means of rheostat $B^6$ up to a point so that the standard reads 100 volts, we move the lever $L^6$ to apply the voltage across 1000 turns of the winding $D^6$,—auxiliary voltmeter $H^6$ being connected to a suitable section on the winding $G^6$ or "$D^6$" so as to get a suitable reading on same. If the lever $L^6$ is moved so that the voltage $A^6$ is supplied to 900 turns it will be necessary to bring the voltage exactly down to 90 volts, in order to make the auxiliary meter $H^6$ read the same; in other words, to secure 90 volt calibration point for the meter $K^6$. If we continue moving the lever to 800 turns, 700 turns, 600 turns, etc., we will have to apply voltage of 80, 70, 60, etc., giving all the points required for the calibration or checking or scaling of the voltmeter $K^6$. The same procedure will have to be followed to calibrate a 150 volt voltmeter. The setting of the meter $H^6$ remains the same. All that is necessary is to get 5 additional lever settings at 110, 120, 130 and 140 turn points.

To calibrate, for instance, a 500 volt voltmeter instead of a 100 volt voltmeter, we get the setting for the auxiliary meter $H^6$ on a tap so as to embrace 5 times less turns than before and read the auxiliary meter; that is, apply the standard voltage of 100 volts, instead to 1000 turns, to 200 turns. The auxiliary meter in that case being tapped across another suitable section of the winding $G^6$ so as to deflect it to a proper deflection, the points previously used for calibrating the 100 volt voltmeter will give 5 times as high voltage, thus providing calibration points for a 500 volt voltmeter. To calibrate a 20 volt voltmeter, apply the standard 100 volt on a tap 5 times as high; that is, across 5000 turns instead of 1000, which will give 5 times lower voltage for the taps previously used for the 100 volt voltmeter. It can be seen that in order to make the ratios obtained for the voltages applied to the winding sections of winding $G^6$ exactly equal the ratio changes in turns secured by the lever $L^6$, which taps this winding $D^6$, we have to be sure that for each consecutive tap the counter E. M. F.'s or back E. M. F.'s stay always in the same fixed ratio to the impressed E. M. F.'s, or internal E. M. F.'s. To secure the same ratio changes; that is, that the internal E. M. F.'s change in the same proportion as the impressed E. M. F.'s, it is necessary to observe a strict rule in dimensioning the winding $G^6$, namely, that the resistances from the beginning of winding to any tap are proportional exactly to the square of the turns, because for constant loss we must have the square of the electromotive force divided by the resistance equal to a constant, or the square of the electromotive force proportional to the resistance and, as the electromotive force is proportional to the number of turns, we have the resistance proportional to the square of the number of turns. This rule will hold good for both potential and current transformers, both being essentially alike. The current transformer transforms relatively large currents and very small potentials, and the potential transformer relatively large potentials and small currents. The only difference is that for potential transformers the above rule has to be adhered to very closely to get the proper accuracy of measurement; whereas for current transformers this rule does not effect the accuracy but only the mechanical and economical features of the design; that is, it guarantees an equality of losses for all the ranges and minimum loss, and consequently minimum dimensions for the apparatus as a whole.

A further application of the aforesaid calibrating transformer is the use of same for calibrating other transformers of different ratios, the apparatus in this case acting as a multiple ratio transformer, each step in the primary being equivalent to one certain capacity transformer. The ratio of each of these possesses the same accuracy. By the use of one of the lower capacity steps where the ration is 1:1, it is possible to determine the ratio correction for all ratios by comparing the primary current direct against the secondary current. This can be done with substantially equal currents with a high degree of accuracy, without depending upon the accuracy of any instruments, by any of the many comparative methods; that is, by either opposing the effects of the two currents and noting the difference or by noting the difference of effect upon two meters against the effect of the same current through both meters or by noting the relative difference of effect on two meters alternately subjected to the primary and the secondary current. These two currents in this case are supposed to be equal. In other words, the deviation from the equality of these two quantities will be the common correction-factor applicable to all ratios. In other words, if the supposed ratio 1:1 by comparing primary against secondary is found to be off 1% all ratios established by the other taps in the primary winding will be off the same amount. Therefore, the apparatus is available, as mentioned before, as a multiple standard for any desired ratio within the limits of its design.

What I am claiming is that it has heretofore been impossible by the use of instrument transformers to provide a light, portable, self-contained measuring instrument with a large number of ranges, for the reason that all instrument transformers heretofore have been built single range only, or if multiple range, this was done by putting in multiple or multiple series the primary coils, which method is very complicated for more than two or three ranges. Furthermore, each transformer was built and adjusted so as to transform, in a fixed ratio. This cannot be accomplished correctly with any transformer over a large range and only approximately by making the transformer heavy and bulky. With the new proposed arrangement, combining the transformer with the instrument, then winding it so as to make the transformation error or deviation of the actual transformation ratio from the supposed ratio a constant amount of percentage, it is possible to absorb the error in the scale of the instrument, resulting in a very small light weight construction. Previously the instrument transformer would weigh five to ten times as much as the portable instrument, now it will weigh five to ten times less than the instrument. In other words it can readily be mounted inside the standard instrument case. The reason for the lighter weight is the fact that for multiple range instruments the essential is to have all ranges respond to the same scale irrespective of the transformation error. The transformation error can therefore be kept large with a resultant large saving in weight of the instrument transformer.

I claim:

1. The method of proportioning electric currents consisting of passing a current of known value through a primary winding of a transformer, and passing the transformed current from the secondary winding of said transformer through a meter; then changing the current value and passing it through a different section of said primary winding giving the same transformed current at said meter.

2. The method of testing electric meters consisting in passing a current of known value through a primary winding of a transformer and a meter under test; passing the transformed current from the secondary winding of said transformer through an auxiliary standard meter; then changing the current value and passing it through a different section of said primary winding and the said meter under test so that the same transformed current will flow through said auxiliary standard meter.

3. The method of testing electric meters consisting in passing a current through a standard meter; through a meter under test and a primary winding of a transformer; passing the transformed current from the secondary winding of said transformer through an auxiliary standard meter; then regulating the current to a value as given by the said standard meter and noting the transformed current indicated by said auxiliary standard; then changing the current value and passing it through a different section of said primary winding and through said meter under test so that the same transformed current will flow through said auxiliary standard meter.

4. The method of calibrating transformer ratios, which comprises passing a current through a selected number of turns of the primary winding of substantially the same number as the turns of the secondary winding and through two elements of a comparing device and noting the effects of the current on said two elements, placing one of said elements in circuit with the secondary winding and passing a current through the selected number of turns of the primary winding to produce the same effect as previously on the element remaining in the primary circuit, noting the effect of the current on the element in the secondary circuit and comparing the differences in the effects on said latter element.

5. The method of calibrating transformer ratios, which comprises causing currents to flow through substantially equal number of turns of the primary and secondary circuits and through two elements of a comparing device, one element being in each circuit, and noting the difference in the effects of the currents on the two elements and passing a current substantially the same as that which obtained in the primary circuit through both elements of the comparing device and noting the difference in the effect of said current on the two elements and then determining the ratio of every one of the ranges of the transformer from the turn ratio and the difference in the above mentioned differences.

6. The method of measuring electric currents of widely different magnitudes with a measuring instrument having a limited current range which is different from the range of the currents to be measured, which comprises passing the current through such a portion of a continuous transformer winding which is of less magnitude than the whole winding that the relation of the number of turns of the portion to the number of turns in the secondary circuit is such as to cause the secondary current to make a large scale deflection on the instrument connected in the secondary circuit and to provide a definite, predetermined transformer ratio, measuring the current produced in the secondary circuit with said instrument and multiplying the magnitude of the measured current by the said predetermined transformer ratio.

7. The method of measuring electric currents of widely different magnitudes with a measuring instrument having a limited current range which is different from the range of currents to be measured, which comprises connecting the instrument in the secondary circuit of a transformer having a plurality of taps in its primary circuit, each tap representing a predetermined transformer ratio, connecting one current lead to one end of the transformer primary circuit and moving the other lead over the taps until the instrument gives a large scale reading and multiplying the reading by the predetermined transformer ratio employed.

In testimony whereof, I have hereunto set my hand at San Francisco, California, this 11th day of November, 1916.

OTTO A. KNOPP.

In presence of—
BALDWIN VALE,
A. J. HENRY.